(12) United States Patent
Ostrem

(10) Patent No.: US 10,983,191 B2
(45) Date of Patent: Apr. 20, 2021

(54) POSITION REFERENCE SYSTEM FOR VESSELS

(71) Applicant: Marine Technologies LLC, Mandeville, LA (US)

(72) Inventor: Tor Eirik Ostrem, Covington, LA (US)

(73) Assignee: Marine Technologies LLC, Cut Off, LA (US)

( * ) Notice: Subject to any disclaimer, the term of this patent is extended or adjusted under 35 U.S.C. 154(b) by 158 days.

(21) Appl. No.: 15/826,395

(22) Filed: Nov. 29, 2017

(65) Prior Publication Data

US 2018/0149727 A1     May 31, 2018

Related U.S. Application Data

(60) Provisional application No. 62/427,787, filed on Nov. 29, 2016.

(51) Int. Cl.
    *G01S 5/02*          (2010.01)
    *G01S 13/93*        (2020.01)
    *G01S 13/84*        (2006.01)

(52) U.S. Cl.
    CPC .......... *G01S 5/0284* (2013.01); *G01S 5/0257* (2013.01); *G01S 5/0289* (2013.01); *G01S 13/84* (2013.01); *G01S 13/93* (2013.01)

(58) Field of Classification Search
    CPC ...... G01S 5/0284; G01S 5/0289; G01S 13/84; G01S 13/9307
    See application file for complete search history.

(56) References Cited

U.S. PATENT DOCUMENTS

| | | | | |
|---|---|---|---|---|
| 3,690,767 A | * | 9/1972 | Missio | G01S 13/60 356/5.08 |
| 3,707,717 A | * | 12/1972 | Frielinghaus | G01S 13/874 342/23 |
| 5,274,378 A | * | 12/1993 | O'Conner | G01S 7/003 342/23 |
| 6,404,338 B1 | | 6/2002 | Koslar | |
| 6,493,631 B1 | | 12/2002 | Burns | |
| 6,618,016 B1 | | 9/2003 | Hannan et al. | |
| 7,561,886 B1 | * | 7/2009 | Gonring | G01C 1/00 340/514 |

(Continued)

FOREIGN PATENT DOCUMENTS

| | | |
|---|---|---|
| WO | 2015/092342 A1 | 6/2015 |
| WO | 2016/124949 A1 | 8/2016 |

OTHER PUBLICATIONS

International Search Report and Written Opinion corresponding to PCT/US2017/063777, dated Mar. 8, 2018, 9 pages.

*Primary Examiner* — Peter M Bythrow
(74) *Attorney, Agent, or Firm* — Foley & Lardner LLP

(57) ABSTRACT

A system and method may include receiving, by multiple vessel nodes, RF signals communicated from a target node coupled to a target object. A range measurement between respective vessel nodes and the target node may be determined. A range measurement from at least two of the vessel nodes may be received. Relative geographic coordinates of the vessel and the target node using the range measurements received from the at least two vessel nodes may be determined. The relative geographic coordinates of the vessel and target object may be determined.

32 Claims, 7 Drawing Sheets

(56) References Cited

U.S. PATENT DOCUMENTS

| | | | |
|---|---|---|---|
| 7,764,217 B2 | 7/2010 | Yannone | |
| 7,821,453 B2 | 10/2010 | Wu et al. | |
| 7,843,379 B2 | 11/2010 | Menzer et al. | |
| 7,860,651 B2 | 12/2010 | Morgan et al. | |
| 8,164,514 B1 | 4/2012 | Yang et al. | |
| 8,659,476 B2 | 2/2014 | Eidloth et al. | |
| 9,430,947 B2* | 8/2016 | Richardson | G08G 3/02 |
| 9,904,293 B1* | 2/2018 | Heap | G05D 1/0022 |
| 9,927,520 B1* | 3/2018 | Ward | G01S 13/937 |
| 10,259,555 B2* | 4/2019 | Ward | B63B 79/40 |
| 2003/0137445 A1* | 7/2003 | Van Rees | G05D 1/0206 |
| | | | 342/41 |
| 2003/0147064 A1* | 8/2003 | Timothy | G01C 3/08 |
| | | | 356/4.01 |
| 2008/0051099 A1* | 2/2008 | Moore | H04W 48/16 |
| | | | 455/454 |
| 2008/0165046 A1* | 7/2008 | Fullerton | G01S 7/003 |
| | | | 342/21 |
| 2010/0070118 A1* | 3/2010 | Yamada | B63H 25/00 |
| | | | 701/21 |
| 2011/0276305 A1* | 11/2011 | Rinnan | B63B 39/00 |
| | | | 702/141 |
| 2012/0313807 A1* | 12/2012 | Yanagi | G01S 13/726 |
| | | | 342/59 |
| 2013/0194126 A1* | 8/2013 | Paoletti | G01S 13/931 |
| | | | 342/55 |
| 2014/0129126 A1* | 5/2014 | Richardson | G08G 3/02 |
| | | | 701/300 |
| 2014/0247184 A1* | 9/2014 | Wendel | G01S 5/14 |
| | | | 342/357.48 |
| 2015/0219747 A1 | 8/2015 | Thevenet et al. | |
| 2016/0214534 A1* | 7/2016 | Richards | H04N 13/204 |
| 2018/0074161 A1* | 3/2018 | Rosenbaum | G01S 5/14 |

* cited by examiner

US 10,983,191 B2

POSITION REFERENCE SYSTEM FOR VESSELS

BACKGROUND OF THE INVENTION

This application claims priority to U.S. Provisional Patent Application having Ser. No. 62/427,787 filed on Nov. 29, 2016, the contents of which are hereby incorporated by reference in their entirety.

BACKGROUND OF THE INVENTION

Marine vessels need to know their relative position to other vessels and stationary objects for navigation, position keeping, and other reasons. Using the Global Navigation Satellite System (GNSS) is a way that ships have handled such location determination globally. Maritime regulations for positioning requires at least two different technologies for acquiring positioning measurements, whereas the GNSS system is one technology for global positioning. Relative reference systems, such as RadaScan® and CyScan®, which are marine-based radar systems, are needed where GNSS systems have limitations (e.g., satellite obstructions close to oil rigs). RadaScan and CyScan have moving parts and are complex and expensive in nature. As a result of the marine-based radar systems having moving parts, maintenance on the moving parts is generally required. As such, there is a need for an alternative technology that is less expensive and less complex than currently available relative reference systems.

SUMMARY OF THE INVENTION

A relative positioning system of a vessel may use local communication nodes and mathematical equations for calculating position of marine vessels relative to a fixed position structure or other vessels, for example. The mathematical calculations may utilize trilateration equations. In an embodiment, multiple nodes with RF cards each combined with a left-hand or right-hand circular polarization antenna that is stationary or mounted on the vessel may be used. The antenna may be fixed position antenna and may provide for 360-degrees of communications or omnidirectional communications. The range measurements from each RF card may be mathematically fused by (i) a state estimator with acceleration, and (ii) angular rate measurements made by an inertial measurement unit (IMU) mounted on the vessel. Multiple communication nodes ("nodes") may be fixedly positioned on a vessel (vessel nodes) for redundancy and error reduction. The nodes may be placed at different locations (e.g., bow, stern, starboard and/or port) to avoid one or more of the antennas being obstructed between two communication points (e.g., vessel and platform, vessel and vessel). In an embodiment, combinations of range measurements from multiple nodes (e.g., bow/starboard) may be used for trilateration to provide accurate position data. In another embodiment, inertial measurements (e.g., acceleration, roll, pitch) may be used by a state estimator and fused with the range measurements to improve accuracy and precision of the relative geographic position data.

One embodiment of a vessel locating system may include multiple vessel nodes configured to perform range communications, where the vessel nodes are positioned on a vessel. Each of the vessel nodes may be communicatively coupled to a respective antenna, and configured to send and receive RF signals communicated from a target node coupled to a target object. A determination of a range measurement between respective vessel nodes and the target node may be made. A processing unit may be in communication with the communication nodes, and be configured to receive a range measurement from at least two of the vessel nodes. Relative geographic coordinates of the vessel and the target node may be made using the range measurements received from the at least two vessel nodes. The relative geographic coordinates of the vessel and target object may be output.

One embodiment of a method may include receiving, by multiple vessel nodes, RF signals communicated from a target node coupled to a target object. A range measurement between respective vessel nodes and the target node may be determined. A range measurement from at least two of the vessel nodes may be received. Relative geographic coordinates of the vessel and the target node using the range measurements received from the at least two vessel nodes may be determined. The relative geographic coordinates of the vessel and target object may be determined.

One embodiment of a system and method for determining position of a vessel relative to another object may include receiving, by multiple vessel nodes fixedly positioned on a vessel, RF signals communicated from a target node. A verified range measurement between the respective vessel nodes and the target node positioned on another object may be determined. Respective range measurements may be received from each of the vessel nodes. A determination of relative geographic coordinates between the vessel and the target node may be performed by a trilateration calculation and fuse the trilateration calculations with inertial measurements in a state estimator. The relative geographic coordinates may be output to enable a vessel operator to know relative position of the marine vessel relative to the object on which the target node is positioned.

One embodiment of a process for performing relative position measurements may include receiving, by multiple vessel nodes on a vessel, RF signals communicated from a target node. A verified range measurement between the respective vessel nodes and the target node may be determined. A respective verified range measurement may be received from each of the vessel nodes. Relative geographic coordinates between the vessel and the target node may be determined by performing a trilateration calculation and fuse the trilateration calculation with inertial measurements in a state estimator. The relative geographic coordinates may be output.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Figure 1:
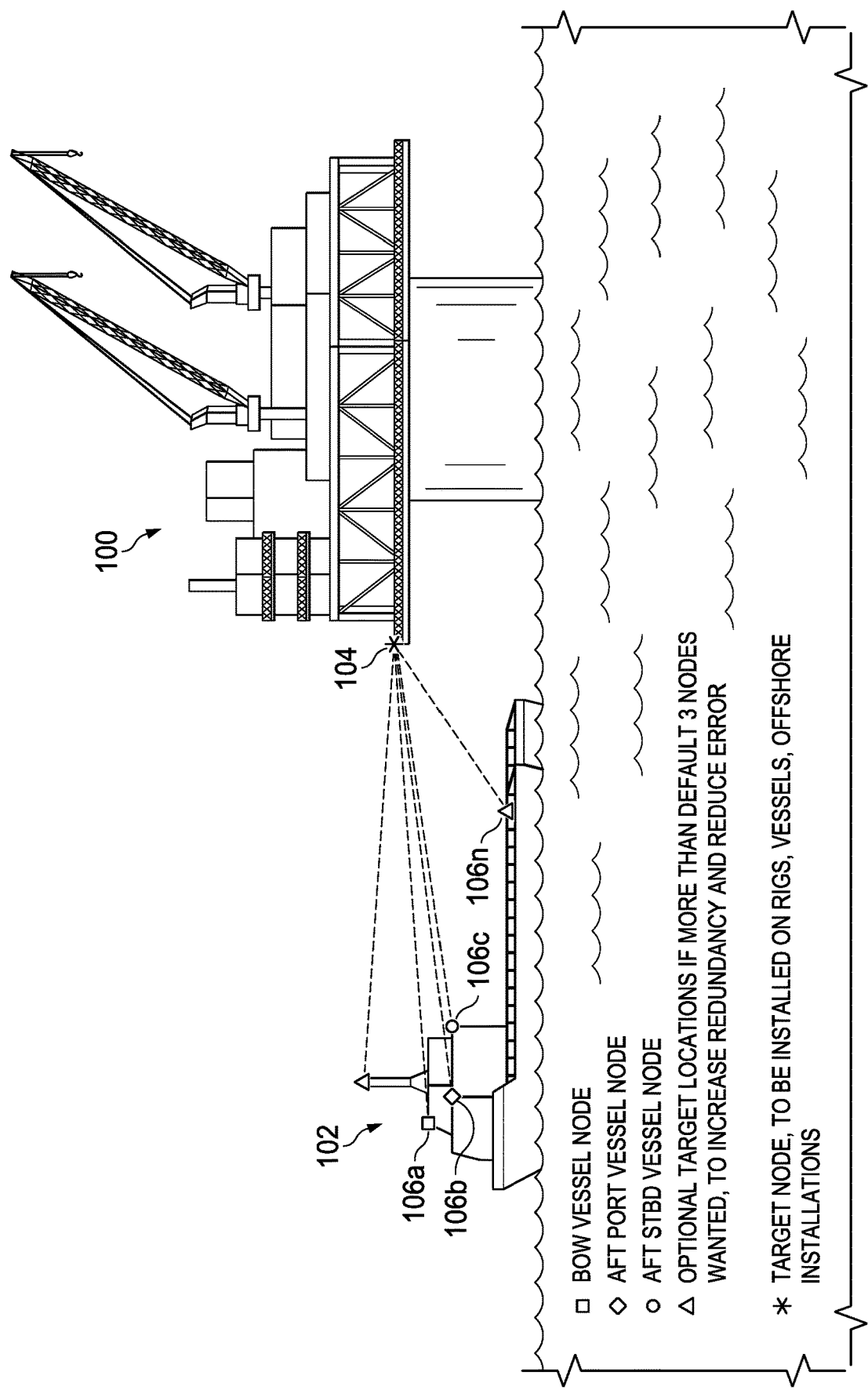
FIG. 1 is an illustration of an illustrative offshore oil drilling platform around which marine vessels may travel.

With regard to FIG. 1, an illustration of an illustrative offshore oil drilling platform 100 around which marine vessels may travel is shown. As understood by marine vessel and offshore oil drilling platform operators, marine conditions have the ability to vary quite a bit so as to cause visibility of the platform to degrade. Moreover, depending on a heading of a vessel and possible other vessels in a local region, vessel operators may lose track of the platform and other vessels. Still yet, because of the size of marine vessels, vessel operators may need more resolution for positioning each portion of the vessel relative to the platform 100. Although described with regard to the platform 100, it should be understood that the principles described herein may be applied to other fixed location structures and moving vessels.

As shown, a node or target node 104 may be positioned on the platform 100, and multiple nodes or vessel nodes 106a-106n (collectively 106) may be positioned on the marine vessel 102, where the nodes 106 are respectively positioned at different locations (e.g., bow, stern, starboard and/or port), to avoid one or more of the nodes 106 with antennas (not shown) being obstructed between two communication points (e.g., vessel 102 and platform 100, vessel 102 and another vessel). More than two nodes 106 may be placed on the vessel 102 for redundancy and error reduction. The nodes 106 may be installed on the vessel 102 by fixedly positioning the nodes 106 into structures of the vessel 102, and be measured for provisioning relative to a center position (e.g., centroid or geometric center of a plane defined by a vessel perimeter) of the vessel. That is, an offset distance of the fixed location of the nodes 106 may be determined when each node 106a-106n is installed for use in determining position of the vessel 102, and specific structures (e.g., bow) of the vessel 102, relative to the platform 100.

As will be described hereinafter in more detail, each of the nodes 106 may include a fixed or non-movable antenna that is left-hand or right-hand circularly polarized and stationary so as not to have moving parts. It should be understood that moving parts may alternatively be utilized, but be less cost effective, have higher-complexity, and have higher maintenance needs. Each of the nodes 106 may include an RF card in communication with a respective antenna, and be configured to calculate range between two nodes (e.g., platform node 104 and respective vessel node 106a, for example) to determine a verified range measurement. In measuring range, the range may be determined by one or more RF signals being transmitted from and received by antennas such that if the antennas are remotely located from the nodes, the measurements from the nodes account for the remote positioning of the antennas. The verified range measurement may be determined as a result of performing multiple readings between the two nodes 104 and 106a for a single range measurement. Alternatively and/or additionally, the verified range measurement may use timing (i.e., amount of time it takes for a communication signal to travel between the two nodes) as a factor for verifying the range measurement. A processing unit (not shown), such as an onboard computer system inclusive of a processing unit with one or more computer processors that is part of a vessel navigation system, may be in communication with each of the vessel nodes 106, and be configured to calculate range and bearing to a target (e.g., the node 104 on the platform 100 or another maritime vessel). With both range and bearing determined, an operator of the vessel can maintain position relative to the platform 100 or vessel(s).

Sensors used by the nodes 106 are less complex and less expensive than other types of sensors that are available, such as laser and frequency modulation (FM) sensors with regard to hardware that is used. The use of laser and FM signals, however, are generally not as reliable and more complex than the communications protocols used by the nodes 104 and 106, as further described herein. For example, the nodes 106 may have no moving parts, which simplifies the node and reduces possible failure modes. Moreover, the use of a left-hand or right-hand circularly polarized antenna allows the nodes 106 to be less weather dependent by using digital modulation over an RF band. Still yet, the nodes 106 may provide for dynamic frequency sending and receiving over a certain RF band, and be less prone to disturbance at one given frequency, which reduces potential loss of signal over a small time span (and longer).

By using a left-hand or right-hand circular polarized antenna, a loss of 20 dB results when a reflection of a signal from a surface, such as water, occurs. A reflected signal can be rejected based on signal strength as a reflected surface results in a left-hand polarized signal becoming a right-hand polarized signal, and vice versa. A non-reflected signal that may be determined by signal strength generally takes a direct path between the transmitter and receiver, thereby providing for the most accurate distance measurement due to having a least time-of-flight (as compared with reflected signals) between a transmitter and receiver (e.g., between node 104 and node 106a). Reflection is a significant challenge for maritime systems, so the use of left-hand or right-hand circular polarized antenna, as described herein, supports a higher quality measurement system (e.g., lower signal strength measurements may be rejected). Moreover, each of the nodes 106 may receive signals from any point within a 360-degree view or omnidirectionally with no moving parts. Alternative configurations of the antenna may be used with a lower field-of-view (e.g., 180-degrees FOV).

In an embodiment, power over Ethernet (POE) may be utilized to power each of the nodes 104 and 106, which enables communication and power with a single cable. For both communication and power supply redundancy purposes, two cables may be utilized.

A high-performing inertial measurement unit (IMU) may be integrated with the positioning system, thereby fusing, as understood in the art, inertial measurements with distance or range measurements so as to improve accuracy through estimation algorithms. Noise may also be reduced as a result of the fusing, which further increases precision of the positioning system. That is, fusing mathematically combines motion of the vessel and range data measured by the nodes 106 so as to determine better vessel positioning data. Each pair of the nodes (e.g., port-starboard 106b/106c, bow-starboard 106a/106c, bow-port 106a/106b) may be configured to measure 120-degrees such that three logical vessel node pairs/receivers may enable 360-degrees of coverage that improves view angle in determining vessel positioning data. It should be understood that the pairs of vessel nodes may be logical pairs. It should also be understood that distance measurements from more than two vessel nodes 106 at a time may be used for determining positioning data or geographic coordinates of the vessel. Each of the nodes 106 has a 360-degree field-of view, but each set of nodes (e.g., logical pair of nodes) may be limited to a 120-degree view angle to reduce noise (i.e., less noise exists within a narrower FOV).

Two vessel nodes 106a/106b, may be used to determine relative position of the vessel relative to a target node 104 combined with an inertial measurement unit. Limitations of trilateration mathematics using two vessel nodes may be improved utilizing sensor fusion with data produced by an inertial measurement unit. Otherwise, multiple pairs (or three or more nodes at a time) selected from the vessel nodes 106 may be used to obtain range from the target node 104 for use in determining relative position of the vessel from the object on which the target node 104 is attached optionally along with sensor fusion with the inertial measurement unit for positioning improvement. In an embodiment, a solar panel may be utilized to charge a rechargeable battery to supply power to the platform node 104, which may avoid unwanted lithium cells.

Figure 2:
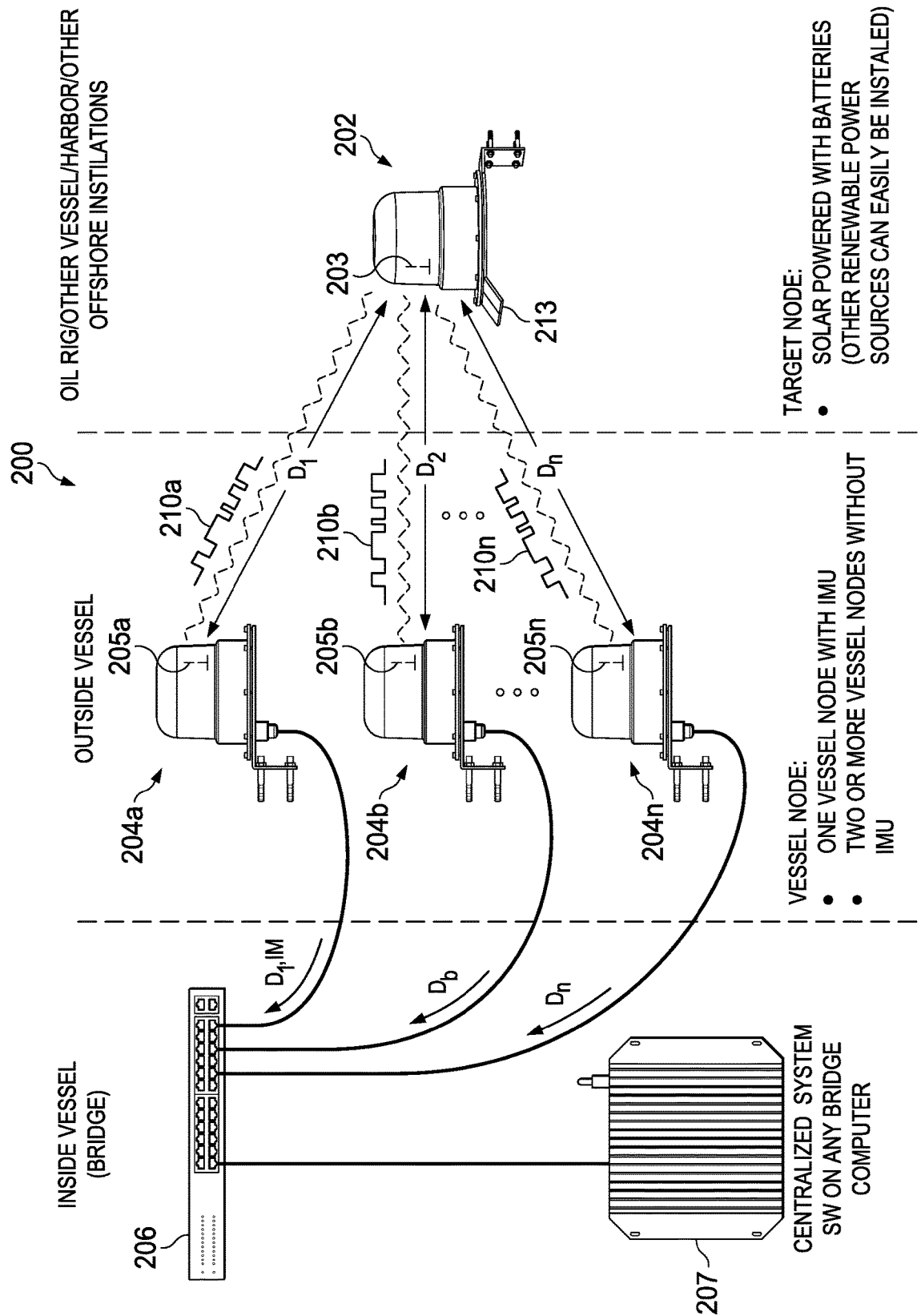
FIG. 2 is an illustration of a more detailed view of the an illustrative relative/local position reference system inclusive of a platform node, vessel nodes, and on-board centralized system that may mathematically fuse the distance measurements with inertial measurements from an on-board IMU, and perform relative geographic positioning calculations.

With regard to FIG. 2, an illustration of an illustrative relative/local position reference system 200 inclusive of a platform node 202 with an antenna 203, vessel nodes 204a-204n (collectively 204) including antennas 205a-205n (collectively 205), and on-board centralized system 206. The antennas are shown to be located at distances $D_1$-$D_n$. In operation, the on-board centralized system 206 may be configured to mathematically fuse the distance measurements $D_a$-$D_n$ with inertial measurements from an on-board IMU 208 is shown. Although the antennas 205 are shown to be within or at the vessel nodes 204, it should be understood that the antennas 205 may alternatively be external from the vessel nodes 204. The antennas may have any stationary configuration capable of communicating RF signals over a desired frequency range using either a left-hand or right-hand polarization. In an embodiment, the nodes 204 may use radio frequency (RF) signals 210a, 210b, and 210n, such as 2.4 GHz and/or 5 GHz frequency range signals, that communicate digital data 212a-212n. In an embodiment, a solar panel 213 may be electrically connected to the platform node 202 to provide power thereto, such as charging a rechargeable battery (not shown). Spread spectrums at about 2.4 GHz, 5 GHz, and/or ultra wide band (UWB) frequency range signals may be utilized. It should be understood that alternative frequencies may be utilized, as well. The relative/local position reference system 200 may use trilateration with an IMU 208 that measures acceleration and angular rate in three dimensions (i.e., 6 degrees-of-freedom), thereby not being limited to roll and pitch compensation only, as is the case with conventional positioning systems. As shown, one vessel node 204a may include the IMU 208, while the other vessel nodes 204b-204n do not include an IMU for cost purposes. However, it should be understood that other node(s) 204b-204n may include an IMU.

In an embodiment, the centralized processing system 206 may be configured with a state estimator as part of software 207. The state estimator may be a non-linear observer state estimator, as understood in the art. In another embodiment, such as a Kalman filter or otherwise, may be implemented as an alternative state estimator. In an embodiment, an outlier rejection filter may be used to reject any measurements from the vessel nodes 204 that are not possible based on motion measurements. As an example, if one of the nodes 204 senses a range that is not possible based on mass, acceleration, speed, or other IMU measurement, that range measurement may be rejected and eliminated prior to or in conjunction with the state estimator. Each of trilateration, outlier rejection filter, and state estimator may be executed by the centralized processing system 206 that may be positioned on a bridge of the vessel, positioned elsewhere on the vessel, or remotely located from the vessel.

Figure 3A:
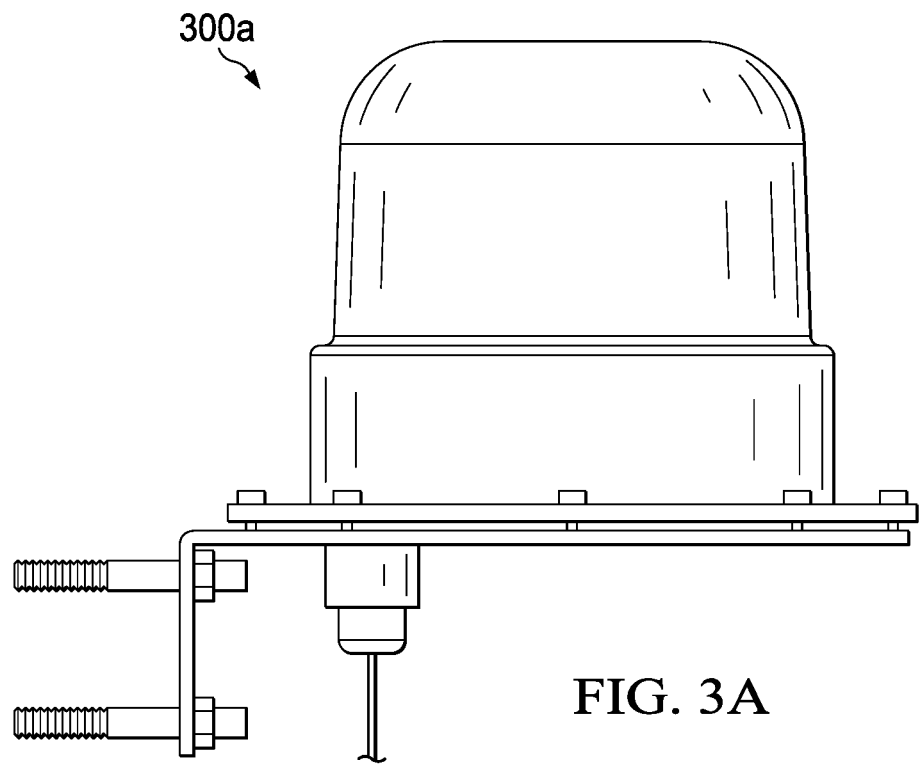
FIGS. 3A and 3B are illustrations of illustrative nodes, including a vessel node (FIG. 3A) and platform node (FIG. 3B)
Figure 3B:
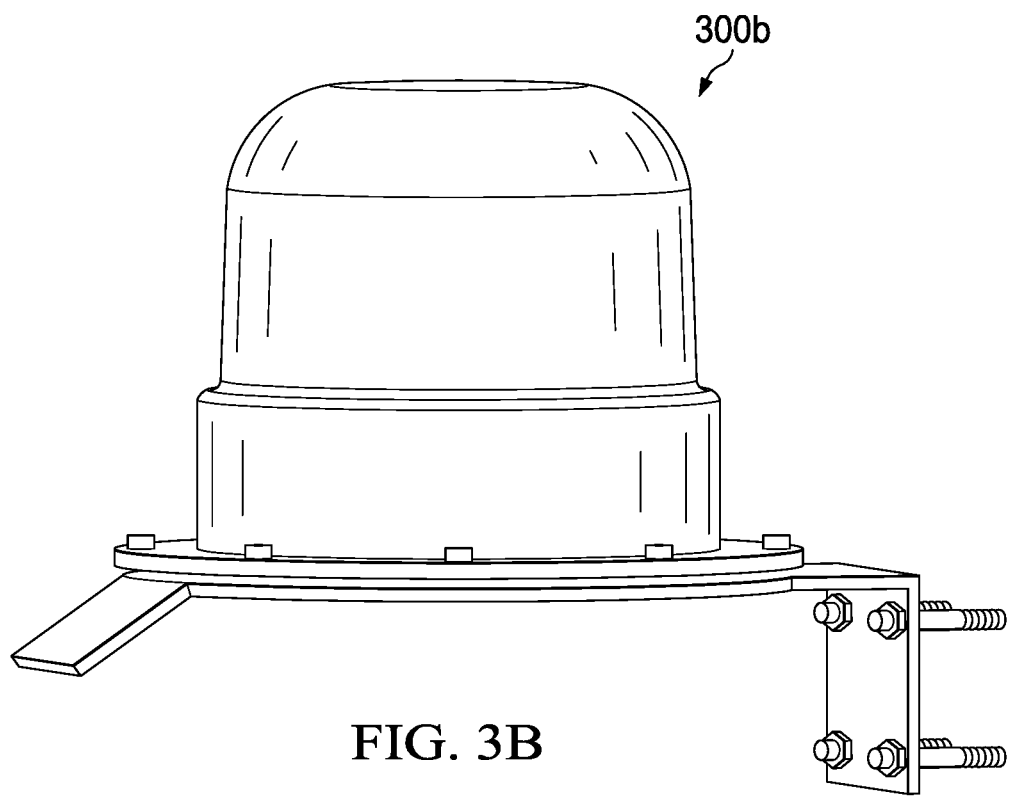

With regard to FIGS. 3A and 3B, illustrations of illustrative nodes, including a vessel node 300a (FIG. 3A) and platform node 300b (FIG. 3B) (collectively 300), are shown. Each of the nodes 300 may include stationary, left-hand or right-hand circular polarized antennas that may be configured to communicate over 2.4 GHz, 5 GHz, and/or UWB ranges using digital data signaling, as understood in the art. In addition, antennas (not shown) of the nodes 300 may include a chirp card and microprocessor. The chirp card may produce a chirp signal or spread spectrum in which frequency increases or decreases over time, as understood in the art. Other configurations with additional and/or different communications and processing hardware may be utilized, as well.

Figure 4:
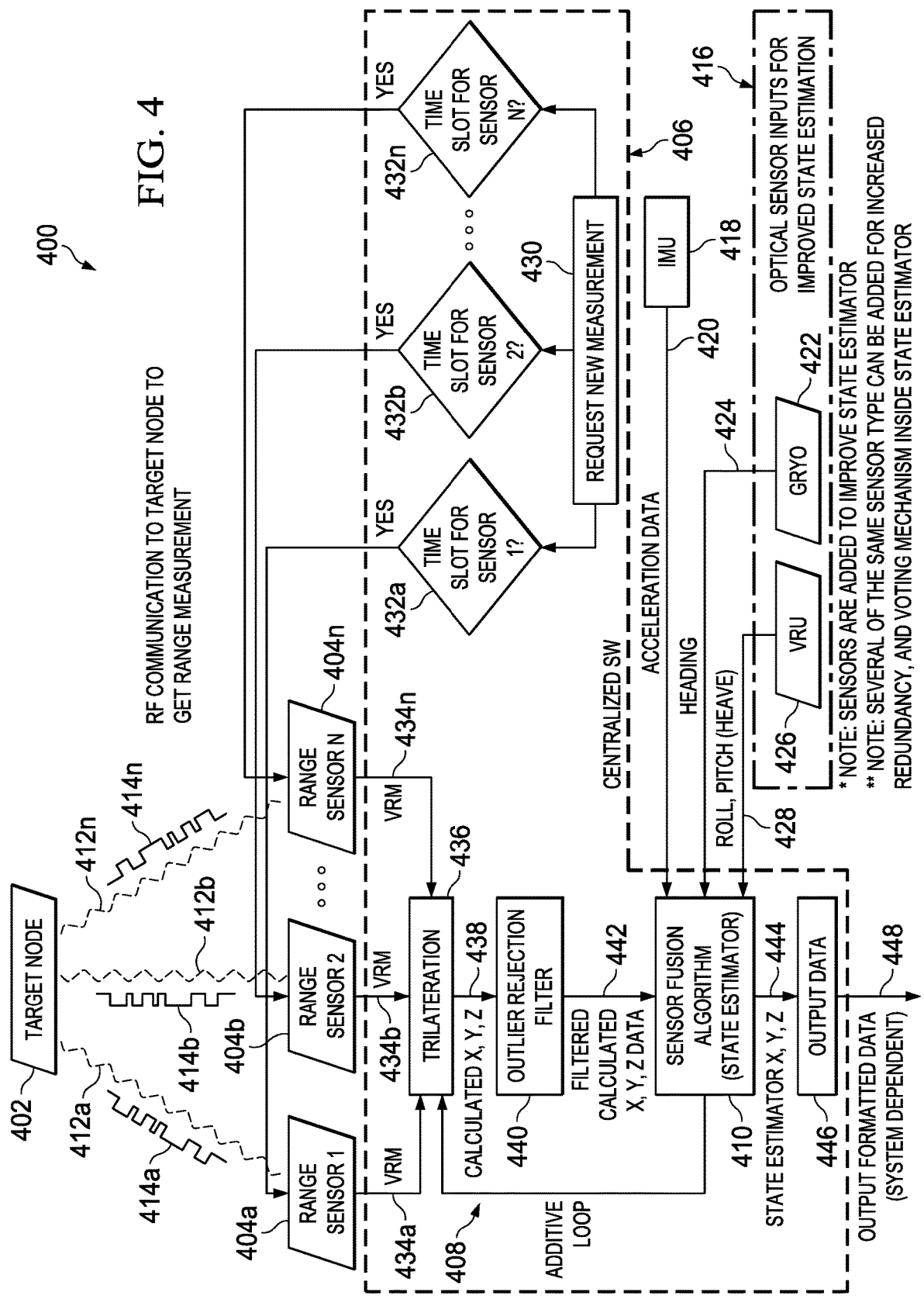
FIG. 4 and corresponding
Figure 4A:
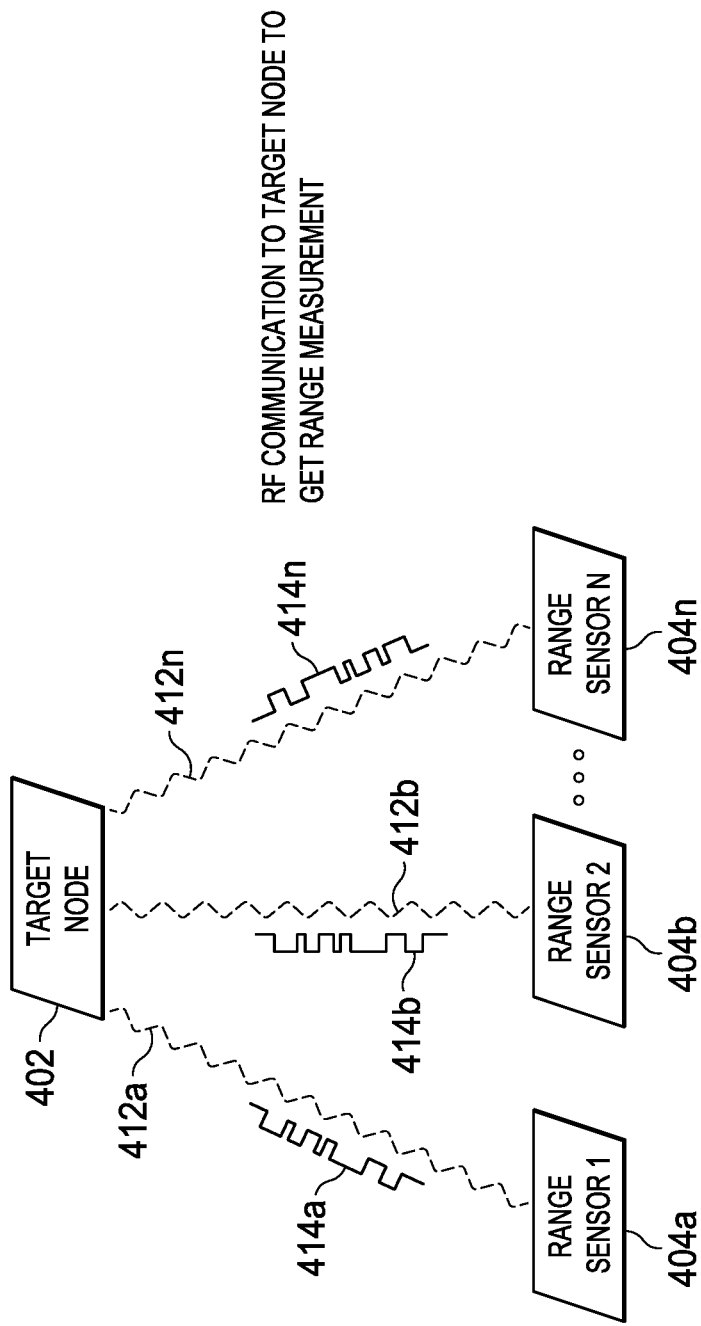
FIGS. 4A and 4B are block diagrams of a centralized software platform of a relative positioning system for accurately locating a position of a marine vessel.
Figure 4B:
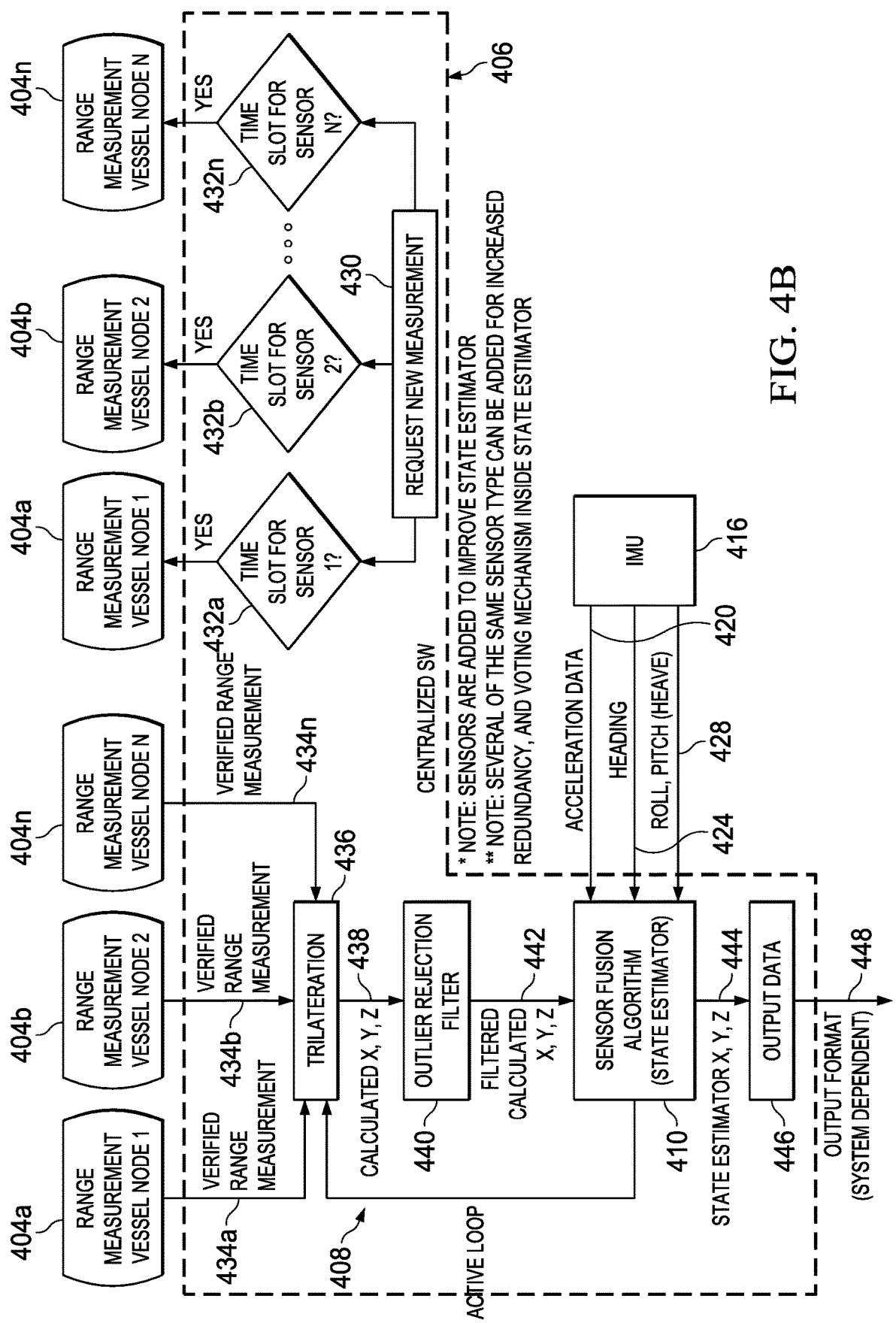

With regard to FIG. 4 and corresponding FIGS. 4A and 4B, block diagrams of a relative positioning system 400 for accurately locating a position of a marine vessel is shown. The system 400 includes a number of sub-systems, including a platform node 402, vessel nodes 404a-404n (collectively 404), and centralized system 406 that executes software 408 inclusive of a state estimator 410. The platform node 402 and vessel nodes 404 may be range measurement nodes that communicate RF signals 412a-412n (collectively 412) to determine range. The RF signals 412 may be 2.4 GHz, 5 GHz, and/or UWB signals, and communicate digital signals 414a-414n (collectively 414), thereby reducing noise as compared to FM, laser, or other signals. The nodes 402 and 404 may include stationary left-hand or right-hand circular polarized antennas (not shown). Each of FIGS. 4A and 4B depict enlarged portions of the system 400. The IMU 416 may include accelerometers 418 that produce acceleration data 420, gyros 422 that produce heading data 424, and velocity reference unit (VRU) 426 configured to generate roll and pitch (heave) data 428 of the vessel.

In operation, the centralized software 406 may include a trigger 430 used to request or trigger new range measurements by each of the nodes 404. The requests may be periodic (e.g., every 60, 30, 10, 2 seconds) or aperiodic (e.g., responsive to a manual request or sensed triggering event, such as sensing a change in direction, change in directional commands, or otherwise). In making the requests, determinations 432a-432n may be made to determine whether a timeslot for each of the respective nodes 404a-404n are available. If so, triggers to the respective nodes 404 may be made to cause range measurements to be made. The range measurements by the respective nodes 404 may be verified range measurements 434a-434n (collectively 434), which may be verified based on performing multiple range measurements between the respective nodes 404 and target node 402.

The verified range measurements 434 may be processed by a trilateration module 436 to produce positional x, y, z data 438 to accurately determine location of the vessel and/or of the nodes 404. An outlier rejection filter 440 may be used to determine whether the positional x, y, z data 438 is outside of physical possibilities based on physical constraints (e.g., moving faster than possible). The outlier rejection filter 440 may output filtered positional x, y, z data (e.g., data determined to be physically possible to achieve based on previous locational x, y, z data 438). The filtered positional x, y, z data 442 may be input into the state estimator 410 to be processed thereby. In an embodiment, the user of the acceleration 420, heading 424, and roll and pitch 428 data by the state estimator 410 fuses the processed data from the nodes 404 with the processed data from the IMU 416. The state estimator 410 may feedback certain state data to the trilateration module 436 to provide for adaptive feedback. State estimated x, y, z data 444 may also be output by an output data module 446 as formatted data 448 for display or other processing using any communications protocol, as understood in the art. The formatted data 448 may be system dependent, and be based on specific configurations of any given system used within or external of the vessel. The display may include displaying a graphical image (e.g., top view outline) of the vessel relative to a location of the remote node or object on which the remote node is attached. Ranges from each of the vessel nodes relative to the remote node may be displayed on the graphical image, as well.

In particular, FIG. 4B shows the centralized software 408 of the vessel relative range determining system with the state estimator 410 that may be executed on a processing unit. The centralized system may also be in communication with an IMU 416 for generating inertial data. The state estimator 410 may be a non-linear state observer. In an embodiment, the state estimator 410 is a Kalman filter. Alternative state estimators may be utilized, as well. A trilateration module 436 may be used to determine relative position of the vessel based range inputs, such as a verified range 434*a*-434*n* (collectively 434), from one or more of the nodes 404. As previously described, pairs of range measurements from two nodes at a time may be used to measure 120-degree or other angles to reduce noise may be used by the state estimator 410 in performing range estimates. In being verified ranges 434, the nodes 404 may perform multiple measurements. As shown, an outlier filter 440 may be used to filter position data that does not meet possible physical constraints as measured by the IMU 416. That is, if verified range measurements determined by the vessel nodes are too large to be possible, then those verified range measurements may be filtered prior to entering the state estimator 410, thereby providing an extra level of verification beyond the verified range measurements.

In general, most range determining systems that generate a local position reference for a vessel compared to a target calculate range and bearing. The assumption is that positioning between the vessel and the target is horizontal range and bearing. However, if sufficient distance exists between a single transponder system and a single target system in height (Z-axis), the range and bearing may be reflected into a 3D space. As understood in the art, conventional maritime systems are limited to a horizontal plane (i.e., 2D space). In addition to be able to determine relative range measurements between the vessel nodes and the target node(s), the principles described herein provide for the ability to determine relative elevation measurements along the Z-axis, and as such, negate the difference in the Z-axis mounting between vessel nodes and target node(s) to provide a proper horizontal plane representation for maritime systems, such as dynamic positioning systems (DPSs). The use of the IMU 416 allows for measuring movement, including acceleration and rotational motion of the vessel, and by combining range measurements with motion using the state estimator 410, elevation of the target node may be determined. This may improve maritime systems, such as a DPS, whereas before to negate issues in elevation difference between a transponder and a target (e.g., CyScan and RadaScan), the operator of a DPS was required to recalibrate the use of these systems to negate false positioning data while moving a vessel if the elevation difference was high enough. Hence, by determining elevation or height of the target node, these negative impacts of operation of the vessel is removed.

Figure 5:
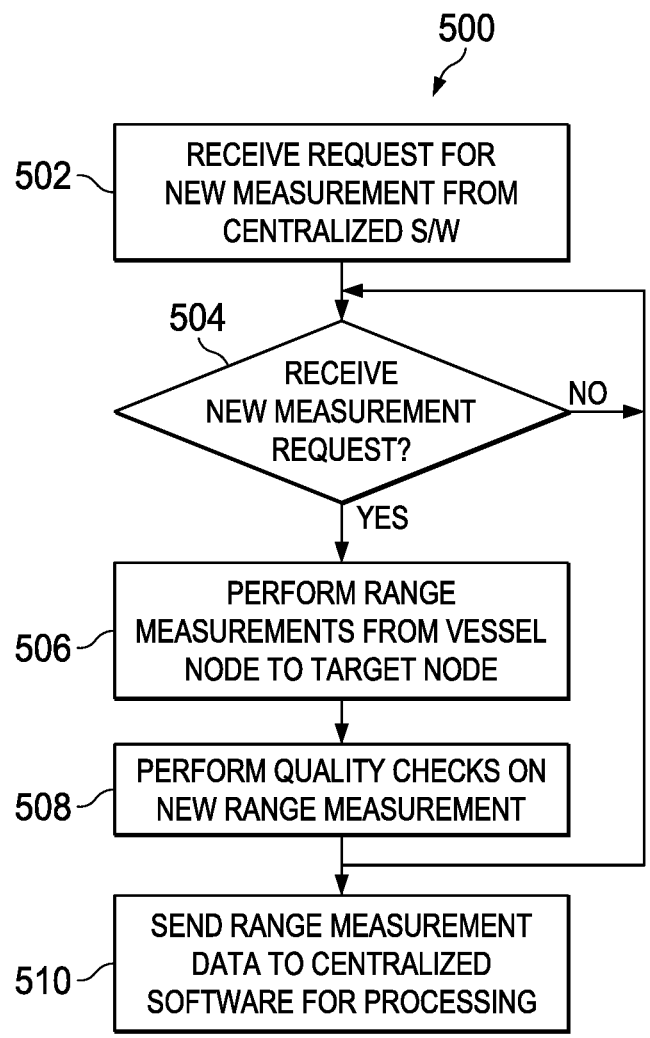
FIG. 5 is an illustrative flow diagram depicting an operating process for determining a relative measurement of the vessel relative to a target (e.g., platform, vessel, or otherwise) by a vessel node.

With regard to FIG. 5, an illustrative flow diagram depicting an operating process 500 for performing range measurements of a vessel relative to a target (e.g., platform, vessel, or otherwise) by a vessel node as previously described is shown. At step 502, the process 500 may include receiving a request for a new measurement from centralized software (e.g., computing system on a bridge of the vessel). A processing unit of the node may wait for a new measurement request to be received from the centralized software at step 504. If a new request is determined to have been received at step 504, the processing unit of the node may perform range measurement(s). The processing unit of the node may include a general computer processor or a specific computer processing device, such as a chirp chip, as understood in the art, that may be configured to perform a relative distance measurements from the vessel node to a target node at step 506.

In an embodiment, the vessel nodes and/or platform node may be configured with network address(es) of the other nodes so that range communications may be limited to being between two specific nodes (i.e., a vessel node and the target node). The platform node may include a parameter inclusive of an identifier indicating that the node is a platform node with which the vessel nodes may communicate in performing measurement calculations. At step 508, a raw measurement quality may be checked by performing multiple reads or otherwise.

In an embodiment, range or distance measurement data may be computed by a processing unit, such as by the chirp chip, and communicated to a centralized software system at step 510. The data or notification of the data being received may be fed back to step 504 (or another process) to indicate that the range measurement is complete, thereby enabling the node to perform a next range measurement in response to another measurement request. If, at step 504, a determination is made that a new request to make a range measurement is not received, the process 500 may continue to wait for a request by repeating step 504. In an alternative embodiment, a delay or conditional pause may be included prior to step 504 to reduce the chance that the process 500 will be consumed by repeating step 504. An exit condition (not shown) may be included to avoid the process from being an endless loop.

One embodiment of a process for performing relative position measurements may include receiving, by multiple vessel nodes on a vessel, RF signals communicated from a target node. A verified range measurement between the respective vessel nodes and the target node may be determined. A respective verified range measurement may be received from each of the vessel nodes. Relative geographic coordinates between the vessel and the target node may be determined by performing a trilateration calculation and fuse the trilateration calculations with inertial measurements in a state estimator (see FIG. 4, for example). The relative geographic coordinates may be output.

Another embodiment of a process may include receiving, by multiple vessel nodes, RF signals communicated from a target node coupled to a target object. A range measurement between respective vessel nodes and the target node may be determined. A range measurement from at least two of the vessel nodes may be received. Relative geographic coordinates of the vessel and the target node using the range measurements received from the at least two vessel nodes may be determined. The relative geographic coordinates of the vessel and target object may be determined.

Receiving the RF signals may include receiving RF signals by range sensors. Receiving RF signals may include receiving RF signals using sets of receivers from substantially mutually exclusive sectors (e.g., three sectors of 120-degree angles) from the vessel. Receiving RF signals may include receiving RF signals via fixed position antennas. Receiving RF signals via fixed position antennas includes may include receiving RF signals using left-hand or right-hand circularly polarized antennas.

In an embodiment, outlier verified range measurement values may be outlier filtered to generate filtered geographic coordinates. Inertial data, including acceleration and angular velocities, of the vessel may be measured, and states of the vessel may be estimated by applying the inertial data to the geographic coordinates to determine state estimator geographic coordinates that are more accurate than geographic coordinates only from the filtered geographic coordinates.

A state estimator may be executed to determine the relative geographic coordinates of the vessel relative to another object on which the remote antenna is positioned. The geographic coordinates of the vessel may be three-dimensional geographic coordinates. The communication nodes may include at least three to observe a 360-degree view. Receiving the RF signals may include receiving digital data therefrom. The RF signals may be about 2.4 GHz, about 5 GHz, or UWB frequencies.

Each of the communication nodes may be physically calibrated or determined relative to a center position of the vessel during a provisioning process of provisioning each of the vessel nodes. The relative locations of the vessel nodes relative to a center position of the vessel or any other feature (e.g., bow, starboard, port, stern) of the vessel may thereafter be used to determine relative distance from any feature of the vessel to another object on which a node being used for range detection is positioned. Outputting the relative geographic coordinates may include displaying the relative geographic coordinates relative to the center position of the vessel. Outputting the relative geographic coordinates may include displaying a graphical representation of the vessel relative to a location of the remote antenna.

Although the principles described herein provide for vessel nodes to receive RF signals from a target node and perform distance measurements, it should be understood that the functionality of the vessel nodes and target node may provide for opposite functionality to be performed to provide for the same or similar relative position measurements, as described herein. In other words, the vessel nodes may generate signals that the target node generates, and the target node may perform range measurement processing that the vessel nodes perform. In such a reverse functionality configuration, the target node may communicate measured relative position data back to the vessel nodes to enable the relative range determining process to be performed thereon utilizing inertial measurement data or otherwise. In either configuration, the target object may include one or more target nodes (e.g., one on each side and/or each corner of the target object).

It should be understood that the vessel may be other types of vessels, such as airplanes, vehicles, military equipment, or otherwise.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

What is claimed:

1. A vessel locating system, comprising:
  a plurality of vessel nodes configured to perform range communications, and being positioned on a vessel, each of the vessel nodes including a processor communicatively coupled to a respective antenna, and configured to:
    receive RF signals communicated from a target node coupled to a target object; and
    determine a range measurement between respective vessel nodes and the target node;
  a processing unit in communication with said communication nodes, and configured to:
    receive a range measurement from the respective processors of at least two of the vessel nodes;
    determine relative geographic coordinates of the vessel and the target node using the range measurements received from the at least two vessel nodes; and
    output the relative geographic coordinates of the vessel and target object.

2. The vessel locating system according to claim 1, wherein said processing unit is further configured to calculate the relative geographic coordinates as a function of inertial measurements of the vessel.

3. The vessel locating system according to claim 2, wherein said processing unit is further configured to execute an outlier rejection filter to remove outlier range measurement values, thereby generating filtered range measurements.

4. The vessel locating system according to claim 1, wherein said processing unit is further configured to execute a state estimator in determining the relative geographic coordinates of the vessel.

5. The vessel locating system according to claim 4, further comprising an inertial measurement unit configured to measure acceleration and angular velocities of the vessel and generate inertial data of the vessel, and wherein said processing unit, in executing the state estimator, is further configured to calculate the relative geographic coordinates using the inertial data.

6. The vessel locating system according to claim 1, wherein said processing unit is further configured to receive range measurements from multiple sets of a plurality of vessel nodes, and wherein each of the sets of vessel nodes define substantially mutually exclusive angular sectors from the vessel that are used to determine the geographic coordinates.

7. The vessel locating system according to claim 1, wherein the antennas are fixed position antennas.

8. The vessel locating system according to claim 7, wherein the fixed position antennas are left-hand or right-hand circularly polarized antennas.

9. The vessel locating system according to claim 1, wherein the relative geographic coordinates of the vessel are three-dimensional geographic coordinates.

10. The vessel locating system according to claim 1, wherein the plurality of vessel nodes include at least three vessel nodes configured to communicate omnidirectionally.

11. The vessel locating system according to claim 1, wherein the RF signals include digital data used to determine range between the vessel nodes and the target node.

12. The vessel locating system according to claim 11, wherein the RF signals have center frequencies at about 2.4 GHz, about 5 GHz, or ultra wide band (UWB) frequencies.

13. The vessel locating system according to claim 1, wherein said processing unit is further configured to calibrate or establish physical position of each of the vessel nodes relative to a certain position of the vessel.

14. The vessel locating system according to claim 13, wherein said processing unit, in outputting the relative geographic coordinates, is configured to display the relative geographic coordinates based on the certain position of the vessel.

15. The vessel locating system according to claim 1, further comprising an electronic display, and wherein said processing unit, in outputting the relative geographic coordinates, is further configured to display a graphical representation of the vessel relative to a location of the target node.

16. The vessel locating system according to claim 1, wherein the processors of said vessel nodes are further configured to verify the range measurements, and wherein said processing unit, in receiving the range measurements from the at least two vessel nodes, is configured to receive the verified range measurements.

17. A method, comprising:
  receiving, by a plurality of vessel nodes including processors for determining range measurements, RF signals communicated from a target node coupled to a target object;
  determining, by the processors of at least two of the vessel nodes, a range measurement between the respective at least two vessel nodes and the target node;
  receiving range measurements from the at least two vessel nodes;
  determining relative geographic coordinates of the vessel and the target node using the range measurements received from the at least two vessel nodes; and
  outputting the relative geographic coordinates of the vessel and target object.

18. The method according to claim 17, further comprising calculating the relative geographic coordinates as a function of inertial measurements of the vessel.

19. The method according to claim 18, further comprising executing an outlier rejection filter to remove outlier range measurement values, thereby generating filtered range measurements.

20. The method according to claim 17, further comprising executing a state estimator in determining the relative geographic coordinates of the vessel.

21. The method according to claim 20, further comprising:
  measuring acceleration and angular velocities of the vessel; and
  generating inertial data of the vessel inclusive of the acceleration and angular velocities, and further comprising calculating the relative geographic coordinates using the inertial data.

22. The method according to claim 17, further comprising receiving range measurements from multiple sets of a plurality of vessel nodes, and wherein each of the pairs of vessel nodes define substantially mutually exclusive angular sectors from the vessel that are used to determine the geographic coordinates.

23. The method according to claim 17, wherein receiving RF signals includes receiving RF signals using fixed position antennas associated with respective vessel nodes.

24. The method according to claim 23, wherein receiving RF signals includes receiving RF signals that are left-hand or right-hand circularly polarized.

25. The method according to claim 17, wherein determining relative geographic coordinates of the vessel includes determining three-dimensional relative geographic coordinates.

26. The method according to claim 17, wherein receiving RF signals includes receiving RF signals in an omnidirectional manner.

27. The method according to claim 17, receiving RF signals includes receiving digital data that is used to determine range between the vessel nodes and the target node.

28. The method according to claim 27, wherein receiving RF signals includes receiving RF signals that center frequencies at about 2.4 GHz, about 5 GHz, or UWB frequencies.

29. The method according to claim 17, further comprising calibrating or establishing physical position of each of the vessel nodes relative to a certain position of the vessel.

30. The method according to claim 29, wherein outputting the relative geographic coordinates includes displaying the relative geographic coordinates based on the certain position of the vessel.

31. The method according to claim 17, wherein outputting the relative geographic coordinates includes displaying a graphical representation of the vessel relative to a location of the target node.

32. The method according to claim 17, further comprising verifying the range measurements, and wherein receiving the range measurements includes receiving the verified range measurements.

* * * * *